Patented Apr. 8, 1941

2,237,826

UNITED STATES PATENT OFFICE 2,237,826

FERTILIZER COMPOSITION

John C. Woodhouse, Cragmere, Del., assignor to E. I. du Pont de Nemours & Company, Wilmington, Del., a corporation of Delaware No Drawing. Application August 23, 1938, Serial No. 226,245

11 Claims. (Cl. 71—28)

This invention relates to fertilizers and more particularly to nitrogenous phosphatic fertilizers and methods of production thereof.

It is known that phosphate rock may be decomposed by various mineral acids to give valuable fertilizer materials, generally referred to as superphosphates. It is also known to add various nitrogen-containing materials to such superphosphates in processes of preparing complete or finished fertilizers.

The practice has become established in the fertilizer industry of adding inorganic nitrogen to superphosphate by treating the same with free or uncombined ammonia that will react with the acidic components of the superphosphate. Anhydrous ammonia, aqua ammonia and nitrogen-containing liquids such as ammoniacal ammonium nitrate and carbonate-containing solutions have been used in treating ordinary superphosphate, double superphosphate, and the like, and as a source of inorganic nitrogen in fertilizers containing superphosphate or double superphosphate as one constituent.

It has been found that the addition of inorganic nitrogen to superphosphate by treating with free or uncombined ammonia such as anhydrous and aqua ammonia is practically and economically desirable, but it has the disadvantage that there is a fairly definite upper limit beyond which the superphosphate will not absorb further ammonia without reduction in its commercial value. That is, it will not absorb further ammonia without partial reversion of the citrate soluble to citrate insoluble phosphoric acid with consequent loss in commercial value of the phosphoric acid.

The addition of fixed ammonia, as well as free or uncombined ammonia, in the form of a liquid or solution is equally desirable. This has been accomplished to a limited degree by the addition of urea, sodium nitrate, ammonium nitrate, and the like to ammoniating solutions. The content of fixed ammonia in ammoniating solutions has been limited, however, by the solubility of the solute at the relatively low temperatures frequently encountered in commercial practice, by the desirability of maintaining a relatively high ammonia content, and by the limitations on the quantity of water that may be used as a solvent and still produce fertilizers of satisfactory physical properties.

It is the object of this invention to provide a means for the preparation of improved ammoniating solutions covering a very wide range of free to fixed ammonia in which, as desired, the fixed ammonia may be in the form of organic, inorganic or a combination of organic and inorganic materials. A second objective of the invention is to provide a method for the manufacture of improved fertilizers.

Other objects and advantages of the invention will be apparent by reference to the following specification in which its preferred details and embodiments are described.

According to the present invention highly desirable nitrifying solutions or liquors may be prepared by the use of sulfamic acid or salts of sulfamic acid as one component and improved nitrogen-containing fertilizers may be prepared by the addition to fertilizer materials of sulfamic acid or its salts alone or by addition to fertilizer materials of nitrifying solutions to which sulfamic acid or its salts have been added. There may be utilized salts of sulfamic acid such as the ammonium, sodium, calcium, magnesium, potassium or like salts or mixtures thereof.

Sulfamic acid is a solid at normal temperatures, (i. e. up to 205° C.), is practically odorless and colorless, contains 14.4% nitrogen, is miscible with water and readily reacts with ammonia to form ammonium sulfamate, and is a good source of nitrogen for plant growth. It, therefore, is especially useful as a constituent of ammoniating solutions or liquors.

I have found that by the use of sulfamic acid or salts of sulfamic acid as one constituent, nitrifying liquors can be obtained in which the ratio of fixed to free ammonia may be varied over a wide range.

This invention may be practiced by addition of sulfamic acid or its salts to the usual fertilizer materials such as superphosphate, double and triple superphosphate, potash salts, organic materials, such as tankage, cottonseed meal, castor pomace, and the like, in various ways.

The sulfamic acid or salts thereof may be added alone (as fixed ammonia containing material), or before, during, or after addition of other materials in preparing a fertilizer. Thus, when it is desired to add fixed ammonia as a liquor to a fertilizer material, sulfamic acid or salts thereof may be used alone or may be added to or substituted for ingredients of other ammoniating solutions generally, such, for example, as the ammoniating or nitrifying solutions described in U. S. Patent 1,894,136, which contain both inorganic and organic ammonia. Again, proceeding according to this invention, sulfamic acid or its salts may be added to a phosphatic material, either before, after, or during addition of other materials, for example, potash salts, such as potassium sulfate, chloride, and nitrate; ammonium salts such as ammonium chloride, nitrate, sulfate, carbamate, mono- and di-ammonium phosphates, or the like; and then the product obtained may be further ammoniated by use of commercial aqua or anhydrous ammonia. Or, alternatively, the phosphatic material may be first ammoniated, somewhat at least by use of ammonia as above described, and thereafter sulfamic acid or its salts added to the ammoniated product; or the sulfamic acid or salts may be added during such ammoniation with ammonia or like nitrogen-containing material while, at the same time, after or before, other materials such as above described may be added as are desired to obtain a finished fertilizer.

For best results in the case of liquid compositions containing one or more normally solid compounds, I have found that it is preferable, altho not necessary, to utilize at least about 10% to 30% by weight of sulfamic acid or its salts in the nitrifying liquor.

I have found, for example, that a desirable finished fertilizer may be obtained by first preparing a liquor containing various proportions of sulfamic acid, ammonia and water. This liquor may be sprayed upon or otherwise mixed with phosphatic materials and the resulting product thereafter mixed with additional fertilizer materials, such as potash salts, and the like and/or other materials as those previously described. The proportions of liquor to superphosphate or other phosphatic materials may vary, dependent upon the nitrogen content which it is desired to have in the final product.

Similarly I have found that a desirable liquor for use in nitrogen incorporation may be obtained by mixing sulfamic acid, ammonia, water and a water soluble fertilizing salt, such as ammonium nitrate. When this nitrogen-containing liquor is incorporated into a phosphatic material as above described a highly desirable fertilizer results which may, if desired, be further mixed with other materials to produce a complete fertilizer.

I have found, as previously indicated, that sulfamic acid may be advantageously incorporated into nitrogen-containing or ammoniating liquors generally. For example, sulfamic acid may be used in ammoniating solutions or nitrogen-containing solutions which have incorporated therein a wide variety of nitrogenous compounds including nitrates, such as sodium and calcium nitrate; ammonium salts of inorganic acids, such as ammonium chloride, ammonium nitrate and ammonium sulfate; ammonium salts of organic acids, such as ammonium formate and acetate; and organic nitrogenous materials such as urea, acetamide, amines, and amino acids.

Its use, however, is not restricted to such combinations, for it may be used alone or in combination with one or more solvents such as water, uncombined ammonia, and other nitrogenous materials. In the solutions thus prepared the ratio of fixed to free or uncombined ammonia can readily be varied over an extremely wide range, for example from 1 part of fixed ammonia and 99 parts of free or uncombined ammonia to 99 parts of fixed ammonia per part of free or uncombined ammonia. The proportion of fixed ammonia derived from inorganic and organic sources can also be varied over a wide range. The variations can be attained without the addition of high percentages of water, such as are generally objectionable in ammoniating solutions, without lowering the total ammonia content unduly and without having crystallization temperatures so high that commercial use is not practicable.

In utilizing solutions containing sulfamic acid, together with ammonia, urea or ammonium nitrate or two or more of these or like materials which are classed as sources of inorganic or organic ammonia, it will be apparent that many advantages are present. Containing, as such solutions do, uncombined ammonia, fixed organic ammonia and fixed inorganic ammonia in a highly concentrated form, they permit the introduction in a single operation and in liquid form, of several forms of ammonia into a fertilizer base; and since the relative proportions of sulfamic acid, urea, or other fixed ammonia compounds and ammonia may be easily varied, a great flexibility of operation is at the hand of the operator. Thus, for example, by varying the composition of the ammoniating solution, from 1 to more than 10% nitrogen can be added to a commercial grade of superphosphate in one operation.

Fertilizers may be produced according to this invention by mixing nitrogen-containing or ammoniating liquid with suitable proportions of superphosphate or mixed fertilizers containing phosphatic materials in a mixing drum, the liquid being sprayed thereupon if desired, and the proportions thereof to superphosphate being dependent upon the desired chemical composition of the final product. Compared with processes involving the separate addition of the same ingredients, a lower temperature on ammoniation of the product results.

Although the proportions of sulfamic acid, ammonia, water and fertilizing salts may be varied without departing from this invention, I prefer to prepare nitrifying liquids which contain at least about 15 parts by weight sulfamic acid, at least about 10 parts ammonia, at least about 5 parts water and at least about 35 parts of a water soluble salt having fertilizing value selected from the group consisting of alkali metal, alkaline earth metal and ammonium salts such as ammonium nitrate, sodium nitrate, calcium nitrate, potassium nitrate, potassium chloride, or the like. More specifically, I have found that a nitrifying liquid of improved characteristics may be obtained by mixing about 15–45 parts by weight of sulfamic acid, 10–25 parts ammonia, 5–20 parts water, and 35–65 parts of a water soluble salt having fertilizing value such as above described.

The following examples, altho not limiting, indicate how the invention may be practiced. It will be noted that the examples are restricted to addition of ammonium sulfamate, but it should be understood that sulfamic acid may be equally as well substituted for its ammonium salt. (Parts given are by weight.)

*Example 1.*—With 3200 lbs. of commercial superphosphate (17% $P_2O_5$), in a conventional mixing drum, there was slowly mixed 376 lbs. of ammonium sulfamate. There resulted a fertilizer base of satisfactory physical appearance containing 2.43% nitrogen and 16.0% water soluble $P_2O_5$. Altho the ammonium sulfamate-water solution was added to the superphosphate in the form of a spray, it could easily be added in thin streams or other manner resulting in intimate mixture.

*Example 2.*—To 3200 lbs. of commercial superphosphate there was added, in a convenient mixing drum, 581 lbs. of an ammoniating liquor containing 94 parts by weight ammonium sulfamate, 247 parts water, 122 parts urea, 53 parts ammonium carbamate, and 65 parts ammonia.

A desirable fertilizer base was obtained containing 4.05% nitrogen and 10.9% water soluble $P_2O_5$.

*Example 3.*—To 1100 lbs. of fertilizer base obtained as described in Example 2, there was added, in a mixing drum, 205 lbs. of tankage, 160 lbs. of muriate of potash and 535 lbs. of filler (sand). A very desirable complete fertilizer was obtained.

Altho the fertilizers were obtained as described in the examples, it will be understood that the sequence and manner of mixture of ingredients may be varied. Thus, for example, the liquor of Example 2 may be added to the superphosphate simultaneously with the ingredients of the present example, or thereafter, as well as before. Likewise dolomite or other fillers may be, equally if not preferably, utilized rather than sand.

It will also be understood that, altho the examples are restricted to use of ammonium sulfamate, the use of this salt of sulfamic acid is only illustrative of a mode of operation according to this invention. As has been previously pointed out, sulfamic acid or other salts of sulfamic acid may be substituted for and utilized equally as well as the ammonium sulfamate of the examples.

Various changes may be made in the methods and details of operation of this invention without departing therefrom or sacrificing any of the advantages thereof.

I claim:

1. A fertilizer nitrifying agent comprising a liquid containing a material selected from the group consisting of sulfamic acid and salts of sulfamic acid, other ingredients being ammonia, and a relatively small quantity of water.

2. A fertilizer nitrifying agent comprising a liquid containing a material selected from the group consisting of sulfamic acid and salts of sulfamic acid, and a water soluble nitrogen salt having fertilizing value selected from the group consisting of alkali metal, alkaline earth metal, and ammonium salts.

3. A fertilizer nitrifying agent comprising a liquid containing a material selected from the group consisting of sulfamic acid and salts of sulfamic acid, and a water soluble nitrogen salt having fertilizing value selected from the group consisting of alkali metal, alkaline earth metal, ammonium salts, and a relatively small quantity of water.

4. A fertilizer nitrifying agent comprising a liquid containing a material selected from the group consisting of sulfamic acid and salts of sulfamic acid, and a member of the group consisting of ammonia and a water soluble nitrogen salt having fertilizing value selected from the group consisting of alkali metal, alkaline earth metal, ammonium salts, urea, and a relatively small quantity of water.

5. A method of producing a fertilizer which comprises adding to acidic fertilizer materials a liquid containing a material selected from the group consisting of sulfamic acid and salts of sulfamic acid.

6. A method of producing a fertilizer which comprises adding to acidic fertilizer materials a liquid containing ammonia, a relatively small quantity of water, and a material selected from the group consisting of sulfamic acid and salts of sulfamic acid.

7. A method of producing a fertilizer which comprises adding to acidic fertilizer materials a liquid containing ammonia, urea, a relatively small quantity of water, and a material selected from the group consisting of sulfamic acid and salts of sulfamic acid.

8. A method of producing a fertilizer which comprises adding to acidic fertilizer materials a liquid containing a water soluble salt having fertilizing value and a material selected from the group consisting of sulfamic acid and salts of sulfamic acid.

9. A method of producing a fertilizer which comprises adding to acidic fertilizer materials a material selected from the group consisting of sulfamic acid and salts of sulfamic acid.

10. A method of producing a fertilizer which comprises adding sulfamic acid to acidic fertilizer materials.

11. The method of producing a fertilizer which comprises adding to acidic fertilizer materials a liquid containing from 10 to 30% by weight of a material selected from the group consisting of sulfamic acid and salts of sulfamic acid.

JOHN C. WOODHOUSE.